United States Patent
Teulings et al.

(10) Patent No.: US 7,323,864 B2
(45) Date of Patent: Jan. 29, 2008

(54) ABSOLUTE ANGULAR POSITION SENSOR ON 360 OF A ROTATING ELEMENT

(75) Inventors: Willem Teulings, Fontenilles (FR); Jeroen Van-Est, Ramonville-Saint-Agne (FR)

(73) Assignee: Siemens VDO Automotive, Toulouse (FR)

( * ) Notice: Subject to any disclaimer, the term of this patent is extended or adjusted under 35 U.S.C. 154(b) by 84 days.

(21) Appl. No.: 10/559,387

(22) PCT Filed: May 13, 2004

(86) PCT No.: PCT/EP2004/005137

§ 371 (c)(1),
(2), (4) Date: Apr. 14, 2006

(87) PCT Pub. No.: WO2004/109234

PCT Pub. Date: Dec. 16, 2004

(65) Prior Publication Data

US 2007/0103146 A1    May 10, 2007

(30) Foreign Application Priority Data

Jun. 6, 2003  (FR) .................................. 03 06826

(51) Int. Cl.
*G01B 7/30* (2006.01)
(52) U.S. Cl. ............................. 324/207.2; 324/207.25; 324/174

(58) Field of Classification Search ........ 324/173–174, 324/207.2, 207.21, 207.22, 207.25; 338/32 H, 338/32 R
See application file for complete search history.

(56) References Cited

U.S. PATENT DOCUMENTS

| 4,369,405 | A | * | 1/1983 | Sato et al. ................... 324/174 |
| 4,982,155 | A | * | 1/1991 | Ramsden ................. 324/207.2 |
| 5,164,668 | A | * | 11/1992 | Alfors ..................... 324/207.2 |
| 5,880,586 | A |   | 3/1999 | Steinlechner et al. |
| 6,064,197 | A |   | 5/2000 | Petersen et al. |
| 6,212,783 | B1 |  | 4/2001 | Lehner et al. |

* cited by examiner

*Primary Examiner*—Jay M Patidar
(74) *Attorney, Agent, or Firm*—Young & Thompson

(57) ABSTRACT

An angular position sensor includes a rotating part (14) which creates a variable magnetic flux, a fixed part (16) for supporting two probes (22, 26) each having an output current, the first (22) of the probes having an output current having discontinuities when the magnetic flux passes through zero, the second (26) of the probes being subjected to a second magnetic flux, shifted by 90° relative to the first flux and having an output current that is a continuous function of the magnetic flux, and a device (30) for adding the currents from the two probes. The range of variation of the current from the first probe (22) is slightly larger than the range of variation of the current from the second probe (26). The sensor is applicable to engine camshafts.

7 Claims, 3 Drawing Sheets

Rotation angle (°)

ABSOLUTE ANGULAR POSITION SENSOR ON 360 OF A ROTATING ELEMENT

The invention relates to a sensor for determining the absolute angular position of a rotating member over 360°.

Although the invention has very wide applications, it will be described in one particular application which imposes very stringent conditions. Thus, it will be described within the context of determining the absolute angular position, over 360°, of the camshaft of an internal combustion engine, the sensor being placed directly in the engine compartment of a motor vehicle.

More precisely, what is foreseen is to start a multicylinder internal combustion engine without a starter, by simply creating an expansion of an air/fuel mixture suitably ignited in one or more cylinders that have the most advantageous position for this purpose in the combustion cycle. It is therefore essential to know the exact position of each piston in each cylinder in order to be able to select the cylinder or cylinders to be used.

In this very stringent particular application, it is impossible to carry out an initialization step, as this initialization would already require the engine to be operating. Technologies using coders or devices of the resistive, optical or capacitive type are tricky to implement. Among magnetic technologies, only magnetoresistive and Hall-effect technologies may be seriously envisioned.

Magnetoresistive and Hall-effect magnetic sensors comprise a magnetic part, giving a gradually varying signal corresponding to the intensity or orientation of the magnetic field, and an electronic part intended to measure and convert the field into an electrical signal. Since the field varies sinusoidally, the magnetoresistive or Hall-effect probes that convert the magnetic field into an output signal do not produce a signal that is linear with the angle of rotation.

Magnetoresistive probes, which are very accurate but expensive, exhibit ambiguities in the output signals, as it is not possible to determine whether the rotary element is in a position between 0 and 180° or between 180° and 360°.

For the solution of this problem, document U.S. Pat. No. 6,212,783 describes the use of two probes—a magnetoresistive probe giving an angular measurement and a Hall-effect probe with binary operation, intended to identify the fact that the angle is between 0° and 180° or is between 180° and 360°. This solution, independently of the high cost of the magnetoresistive probe, has several drawbacks that prevent it being used in the aforementioned application for determining the absolute angle of an engine camshaft. These drawbacks are firstly the fact that a misalignment, even a small one, between the two probes may introduce errors that may range up to 1800, even when the Hall-effect probe exhibits the hysteresis phenomenon. Secondly, the absence of hysteresis in the magnetoresistive probe, owing to the output noise, may create measurement ambiguities around the 360° angle, at which angle the signal exhibits a large discontinuity. Thirdly, the magnetoresistive probes comprise a sintered magnet based on rare earths, which are costly. Finally, the signals obtained must be processed so that a microprocessor is needed to execute an algorithm for calculating angles on the basis of the signals from the two probes. If the microprocessor is placed some distance from the sensor, the drawbacks are even more substantial since it is necessary to have a connection for each of the two probes, and the number of wires is increased, the number of connectors is increased and the computer requires an additional input. This situation constitutes a very considerable drawback in the automobile field in which it is known that connection problems are the main cause of sensor breakdown.

Thus, the aforementioned technology has two essential drawbacks in the case of the foreseen application—on the one hand, the risk of ambiguity in the value of the angle and, on the other hand, the high cost.

The subject of the invention is a sensor for determining absolute angular position over 360° that does not have these ambiguities, that has a low cost and that is very robust, so that it can be used in the engine compartment of a motor vehicle.

These results are achieved according to the invention by the use of two Hall-effect probes in a sensor capable of performing the passive processing of the signal by itself, in order to give an unambiguous (unequivocal) output signal representative of an angle over 360°. This result is achieved by the following features:

the use of a Hall-effect probe with binary operation, as in the aforementioned document U.S. Pat. No. 6,212,783, in order to distinguish the 0 to 180° range from the 180° to 360° range;

the use of two probes working in current source mode, the output currents of which are added; and the introduction of a shift between the ranges of variation of the signals from the two probes, so that no ambiguity exists in the case of the values obtained at 180° and 360°.

More precisely, the invention relates to a sensor for determining the absolute angular position of a rotating member over 360°, which comprises: a rotating part, the rotation of which is linked to that of the rotating member, which rotating part creates a variable magnetic flux, and a fixed part for supporting probes; at least two probes are supported by the fixed part and each has an output current signal, the first of the two probes being subjected to a first magnetic flux that can vary periodically with the rotation of the rotating part having an output signal with discontinuities when the magnetic flux passes in each direction through a specified value, and the second of the two probes being subjected to a second magnetic flux that can vary periodically with the rotation of the rotating part with variations that are shifted in phase by 90° relative to the variations of the first magnetic flux, and having an output signal which is a continuous function of the magnetic flux, and the sensor also includes a device for adding the currents from the two probes, giving an output current signal not having the same value twice over 360°.

Preferably, the feature whereby the output current signal of the sensor does not have the same value twice over 360° is due to the fact that the range of variation of the output current from the first probe is slightly greater than the range of variation of the output current from the second probe.

In one embodiment, the rotating part comprises a magnet, the magnetization direction of which is perpendicular to the axis of rotation of the rotating part, and the fixed part that surrounds the magnet defines two airgaps in which the magnetic fluxes are offset by 90°, the probes being placed in these two airgaps.

Preferably, the specified value of the magnetic flux for which the discontinuity in the signal from the first probe occurs corresponds to the reversal of the sign of the magnetic flux to which the first probe is subjected.

Most usually, the first and second magnetic flux variations are sinusoidal.

Although the probes may be of the magnetoresistive type, it is advantageous, for cost reasons, for the probes to be of the Hall-effect type.

Preferably, the first probe gives a binary signal having two different constant current values between two angular ranges each covering 180°, and the second probe gives an output current signal represented by a function comprising two parts that vary linearly with the angle of rotation, these two parts having opposite slopes.

In one very simple embodiment, the addition device consists of the simple connection of the outputs from the two probes.

It is advantageous for the fixed part forming a pole piece to be made of a material producing a hysteresis phenomenon.

In an advantageous application, the sensor further includes a load resistor that receives the output signal from the addition device, at the terminals of which load resistor a measurement voltage is available.

When the output signal from the probes exhibits modulation, it is advantageous for the sensor to include a filter, preferably of the passive type.

Other features and advantages of the invention will become more clearly apparent from the description that follows, given with reference to the appended drawings in which:

FIG. 1 shows schematically a sensor according to the invention in partial cross section.

Figure 1:
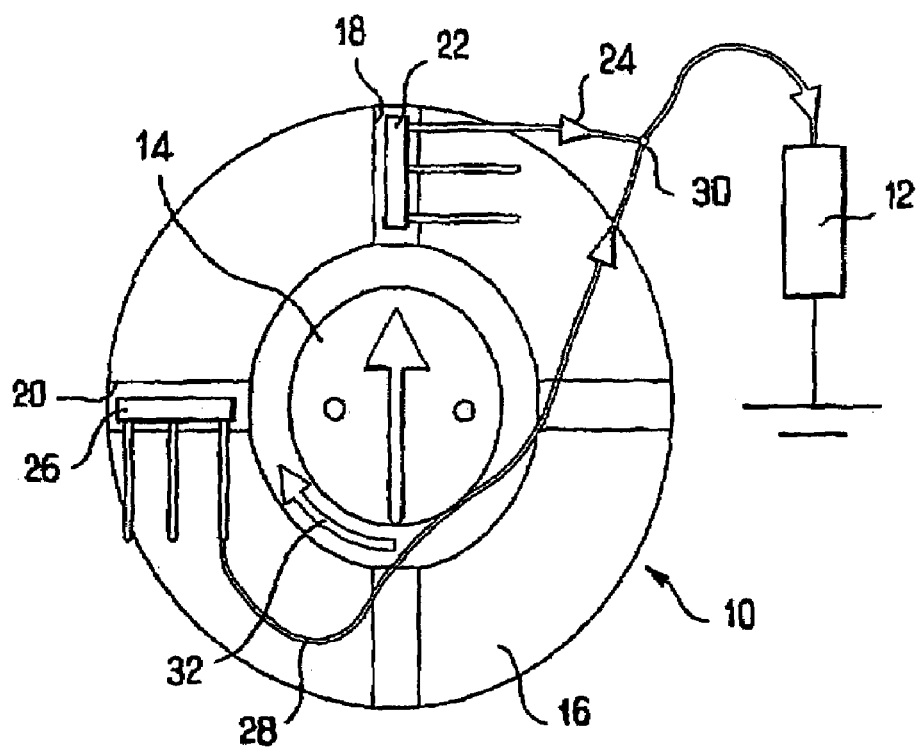
FIG. 1 is a schematic view in partial cross section of a 360° absolute angular position sensor according to the invention.

This sensor, which bears the general reference 10, is intended to transmit a signal to a user device 12 having, for example, a load resistor.

The sensor comprises a magnet 14 mounted on the rotating member, the absolute position of which has to be detected, for example an internal combustion engine camshaft. The magnetization direction of the magnet 14 is diametral, that is to say practically perpendicular to the rotation axis of the magnet 14, this axis itself being perpendicular to the plane of FIG. 1. The magnet 14 may be of a relatively inexpensive type, for example based on NdFeB in a plastic binder.

A pole piece 16, which is fixed relative to the motor, is mounted around the magnet 14 and defines several airgaps, comprising at least a first airgap 18 and a second airgap 20 that are placed 90° to each other. The magnetic fluxes in these airgaps are thus offset by 90°. Each of the airgaps 18, 20 contains a Hall-effect probe.

The first airgap 18 contains a first Hall-effect probe 22 that transmits a current constituting its output signal via a wire 24. This output signal is preferably a binary signal having two different constant levels between 0° and 180° on the one hand, and between 180° and 360° on the other, these being obtained by suitable prior programming.

Figure 3:
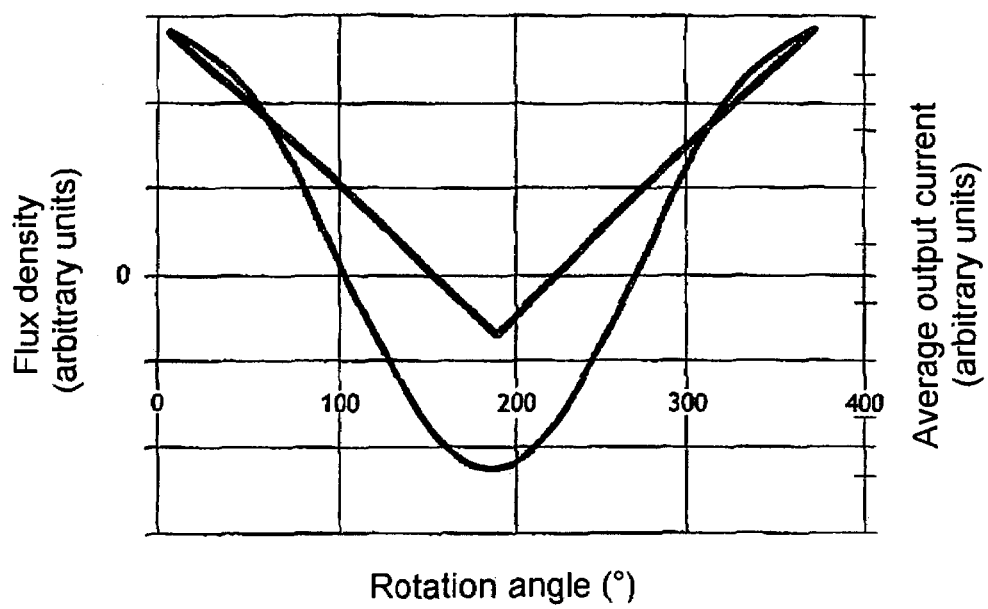
FIG. 3 is a graph indicating the average output current from the second probe as a function of the rotation angle.

The second airgap 20 contains a second Hall-effect probe 26 that transmits a current constituting its output signal via a wire 28. By prior programming, the second Hall-effect probe gives an output current that varies linearly with the rotation angle along a curve decreasing from 0° to 180° (first slope) and then along a curve that increases from 180° to 360° (second slope, opposite the first) as indicated in FIG. 3. It should be noted that, for any value of the current lying within the range of variation, there exist two values of the rotation angle. The use of a single probe therefore does not allow the absolute position to be known over 360°.

In order for the output signal from the second probe to be precise, it is advantageous to use the steepest possible slope permitted by the particular Hall-effect probe. According to the invention, the difference between the two different levels between which the second output signal varies is slightly less than the difference between the two constant levels of the first output signal.

In the sensor according to the invention, the output currents from the two probes 22, 26 are added, that is to say the two wires 24 and 28 are connected at a connection point 30, which represents a device for adding the signals from the two probes.

In FIG. 1 it should be noted that, if we consider the two wires needed to supply the probes 22 and 26 (these wires not being shown) the sensor 10 has only three wires, that is to say three connections with the outside.

The way in which the sensor described with reference to FIG. 1 is mounted and operated will now be described with reference to FIGS. 1 to 4.

Figure 2:
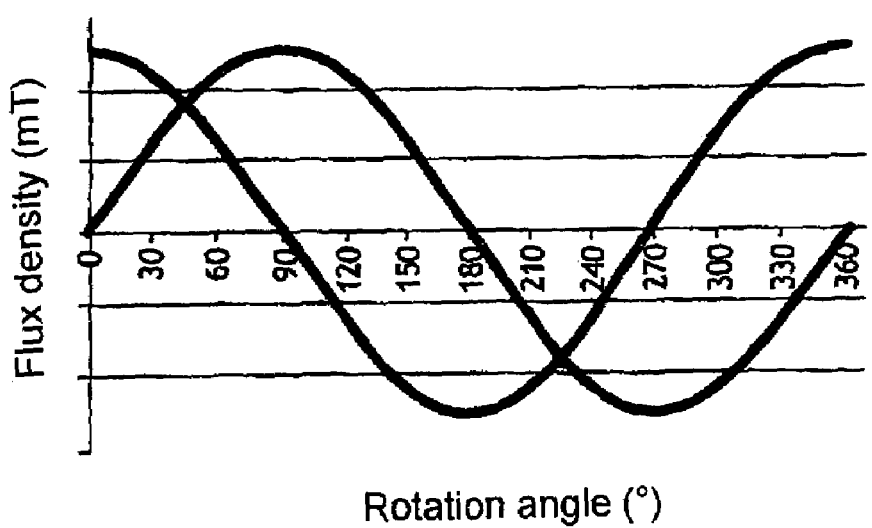
FIG. 2 is a graph showing the flux density seen by each of the probes of FIG. 1.

The sensor is mounted on an internal combustion engine. The magnet 14 is integral with the camshaft and is rotated as indicated by the arrow 32 in FIG. 1. During this rotation, the flux densities in the airgaps 18 and 20 vary as indicated in FIG. 2. It should be noted that these flux densities are shifted by 90°.

Figure 4:
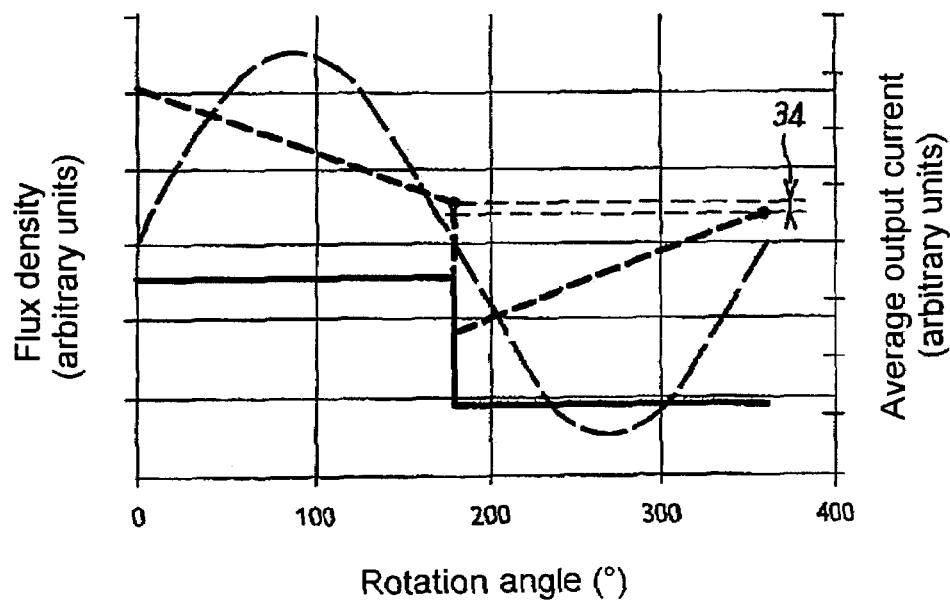
FIG. 4 is a graph showing the signal from the first probe and the overall signal obtained at the output of the sensor.

FIG. 3 shows the average current constituting the output signal from the second Hall-effect probe 26 together with the corresponding flux density. In FIG. 4, the solid line represents the output signal from the first Hall-effect probe 22. Its two constant current levels are separated by a range of variation which, according to the invention, is greater than the range of variation of the signal given by the second probe and as shown in FIG. 3. In this way, the average current forming the resulting output signal obtained by adding the output signals from the two Hall-effect probes, as indicated by the short broken line in FIG. 4, has two ranges of linear variation that not only do not overlap but are also separated by a gap 34. In this way, each value of the average output current from the sensor corresponds unequivocally to a single angle between 1 and 360°.

In an exemplary embodiment, the two probes are of the Micronas IC 856 type and they have a maximum range of variation of 11 mA. This maximum range of variation is used as difference between the two constant levels of the first Hall-effect probe. However, the range of variation used for the second probe is for example 10.7 mA, i.e. 0.3 mA smaller. In this way, a difference of 0.3 mA exists between the output signal from the sensor at 360° and the signal at 180°. This 0.3 mA difference is amply sufficient, taking into account the various noise phenomena and possible hysteresis phenomena, for the absolute value of the angle to be always known unambiguously.

In the case of misalignment of the probes, that is to say if the phase shift between the two probes is not exactly equal to 90°, the signal is still unambiguous, the precision around the 180° and 360° values simply being reduced slightly.

Figure 5:
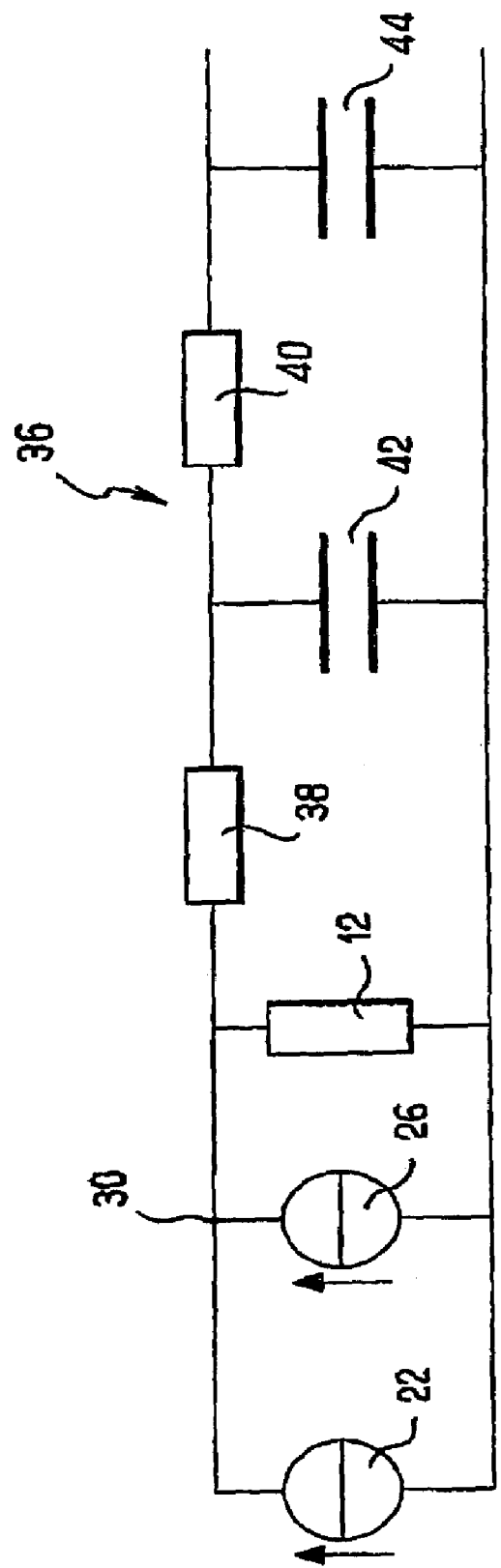
FIG. 5 is a diagram showing an example of the use of the sensor of FIG. 1.

FIG. 5 shows an example of the use of the sensor according to the invention. It should be noted that the Hall-effect probes (Micronas IC 856) considered in the preceding description have an output current modulated by pulses of variable width at a maximum frequency of 1 kHz. The output signal from the sensor must therefore be filtered so that the analog signal obtained is smoothed. FIG. 5 shows an example of a filter used for this purpose.

In FIG. 5, a load resistor 12 is separated from the output, placed on the right in FIG. 5, by a filter 36 shown in the form of a second-order passive filter comprising two resistors 38 and 40 and two capacitors 42 and 44. The combination shown in FIG. 5, comprising the sensor, the load resistor and the filter, may form an independent component that gives a smooth analog signal indicating the absolute position of the rotating member without any ambiguity and in an entirely passive manner.

The sensor thus produced is entirely autonomous and includes no computing element, such as a microcontroller, and it is therefore inexpensive.

To summarize, the sensor according to the invention therefore has the following advantages.

As it requires no active signal processing element, for example a microcontroller, it is autonomous.

Given the absence of a microcontroller and since the sensor has only three connection wires, it has great operating reliability.

Thanks to the absence of an expensive microcontroller, to the reduction in number of connections and to the use of an inexpensive magnet with a plastic binder, the sensor has a low cost.

Thus, the invention relates to a 360° absolute angular position sensor that is autonomous, that is to say the output signal from which can be used directly, which signal may be in the form of a current or a voltage, which requires no active signal processing during use, which is very robust, thanks to the use of a single moving component, which moves by simple rotation, which is inexpensive and which is very reliable due to the small number of connections needed.

Of course, various modifications may be made by a person skilled in the art to the sensors that have just been described merely by way of non-limiting example without departing from the scope of the invention.

The invention claimed is:

1. A sensor for determining the absolute angular position of a rotating member over 360°, characterized in that it comprises:
    a rotating part (14), the rotation of which is linked to that of the rotating member, which rotating part creates a variable magnetic flux;
    a fixed part (16) for supporting probes;
    at least two probes (22, 26) supported by the fixed part and each having an output current signal, the first (22) of the two probes being subjected to a first magnetic flux that can vary periodically with the rotation of the rotating part and having a binary output signal having two different constant current values between two angular ranges each covering 180°, and the second (26) of the two probes being subjected to a second magnetic flux that can vary periodically with the rotation of the rotating part, the variations of the second magnetic flux being shifted in phase by 90° relative to the variations of the first magnetic flux and having an output signal which is a continuous function of the magnetic flux and comprises two parts that vary linearly with the angle of rotation, these two parts having opposite slopes; and
    a device (30) for adding the currents from the two probes, which consists of the connection (30) of two wires (24, 28) carrying the output signals from said probes and giving an output current signal not having the same value twice over 360° such that the range of variation of the output current from the first probe (22) is greater than the range of variation of the output current from the second probe (26).

2. The sensor as claimed in claim 1, characterized in that the rotating part comprises a magnet (14), the magnetization direction of which is perpendicular to the axis of rotation of the rotating part, and the fixed part (16) that surrounds the magnet defines two airgaps (18, 20) in which the magnetic fluxes are offset by 90°, the probes (22, 26) being placed in these two airgaps (18, 20).

3. The sensor as claimed in claim 1, characterized in that the specified value of the magnetic flux for which discontinuities in the signal from the first probe (22) occur corresponds to the reversal of the sign of the magnetic flux to which the first probe is subjected.

4. The sensor as claimed in claim 1, characterized in that the probes (22, 26) are Hall-effect probes.

5. The sensor as claimed in claim 1, characterized in that the fixed part forming a pole piece (16) is made of a material producing a hysteresis phenomenon.

6. The sensor as claimed in claim 1, characterized in that the sensor further includes a load resistor (12) that receives the output signal from the addition device (30), at the terminals of which load resistor a measurement voltage is available.

7. The sensor as claimed in claim 6, characterized in that it further includes a passive filter (36).

* * * * *